(12) United States Patent
Harris et al.

(10) Patent No.: US 6,400,755 B1
(45) Date of Patent: Jun. 4, 2002

(54) DATA TRANSMISSION WITHIN A SPREAD-SPECTRUM COMMUNICATION SYSTEM

(75) Inventors: John M. Harris, Chicago; Rajesh Pazhyannur, Palatine, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/298,422

(22) Filed: Apr. 23, 1999

(51) Int. Cl.$^7$ .......................... H04B 15/00; H04K 1/00; H04L 27/30
(52) U.S. Cl. .................. 375/146; 375/140; 370/342
(58) Field of Search ................ 375/140, 146, 375/141, 147, 150; 370/320, 335, 342, 441

(56) References Cited

U.S. PATENT DOCUMENTS

| | | | | |
|---|---|---|---|---|
| 5,751,761 A | * | 5/1998 | Gilhousen | 375/200 |
| 6,041,034 A | * | 3/2000 | Fukumasa et al. | 370/203 |
| 6,084,884 A | * | 7/2000 | Adachi | 370/441 |
| 6,088,347 A | * | 7/2000 | Minn et al. | 370/342 |
| 6,108,369 A | * | 8/2000 | Ovesjo et al. | 375/146 |
| 6,163,524 A | * | 12/2000 | Magnusson et al. | 370/208 |
| 6,233,231 B1 | * | 5/2001 | Felix et al. | 370/335 |

* cited by examiner

*Primary Examiner*—Chi Pham
*Assistant Examiner*—Phuong Phu
(74) *Attorney, Agent, or Firm*—Kenneth A. Haas

(57) ABSTRACT

Rate assignment circuitry (102) detects when a data transmission begins and originally assigns an Orthogonal Variable Spreading Factor (OVSF) code corresponding to low data rate. Over time, a base station controller (101) determines when an OVSF code and/or a repetition rate should be changed (i.e., data rate increased or decreased). The OVSF code and/or the repetition rate is changed in order to gradually increase the data rate, up to a maximum allowable data rate. Once data transmission ceases for a period of time the OVSF code and/or the repetition rate is changed in order to gradually decrease the data rate, down to a lowest allowable data rate.

12 Claims, 5 Drawing Sheets

DATA TRANSMISSION WITHIN A SPREAD-SPECTRUM COMMUNICATION SYSTEM

FIELD OF THE INVENTION

The present invention relates generally to cellular communication systems and, in particular to data transmission within a spread-spectrum communication system.

BACKGROUND OF THE INVENTION

Communication systems are well known and consist of many types including land mobile radio, cellular radiotelephone, personal communication systems, and other communication system types. Within a communication system, transmissions are conducted between a transmitting device and a receiving device over a communication resource, commonly referred to as a communication channel. To date, the transmissions have typically consisted of voice signals. More recently, however, it has been proposed to carry other forms of signals, including high-speed data signals. For ease of operation, it is preferable to have the data transmission capability overlay the existing voice communication capability, such that its operation is essentially transparent to the voice communication system while still utilizing the communication resources and other infrastructure of the voice communication system.

One such communication system currently being developed with transparent data transmission capabilities is the next generation Code-Division Multiple-Access (CDMA) cellular communication system, more commonly referred to as Universal Mobile Telecommunications System (UMTS) Wideband cdma, or cdma2000. Remote unit data transmission within a Wideband communication system takes place by assigning the remote unit a high-speed data channel (referred to as a dedicated or supplemental data channel) and transmitting data utilizing the data channel.

Typically, as a high-speed data transmission is initiated, the interference produced by the sudden activity can overwhelm power-control algorithms for other users. More particularly, within a CDMA system, all transmissions commonly occur simultaneously within the same frequency band. Because of this, every transmission within the communication system interferes with all other transmissions. A user that immediately accesses the system at a high data rate (i.e., high power) can cause large amounts of interference to other remote units. Eventually the power level for the other transmissions will increase to overcome the interference, however, this may take several seconds. Therefore a need exists for a method and apparatus for data transmission within a communication system that does not overwhelm other users when the data transmission is initiated.

DETAILED DESCRIPTION OF THE DRAWINGS

To address the above-mentioned need, a method and apparatus for data transmission within a communication system is provided herein. Rate assignment circuitry detects when a data transmission begins and originally assigns an Orthogonal Variable Spreading Factor (OVSF) code, or Walsh code corresponding to low data rate. Over time, a base station controller determines when an OVSF code and/or a repetition rate should be changed (i.e., data rate increased or decreased). The OVSF code and/or the repetition rate is changed in order to gradually increase the data rate, up to a maximum allowable data rate. Once data transmission ceases for a period of time the OVSF code and/or the repetition rate is changed in order to gradually decrease the data rate, down to a lowest allowable data rate. Adjusting the data rate as such allows other users sufficient time to react to a sudden usage of a supplemental (or dedicated data) channel.

The present invention encompasses a method for data transmission within a spread-spectrum communication system. The method comprises the steps of determining that a data transmission needs to take place and initiating data transmission within the communication system utilizing a first Orthogonal Variable Spreading Factor (OVSF) code. A determination is made to whether data transmission has continued for a preceding period of time and transmission of data within the communication system takes place utilizing a second OVSF code based on the determination.

The present invention additionally encompasses a method for data transmission within a spread-spectrum communication system. The method comprises the steps of determining that data transmission needs to take place and initiating data transmission within the communication system utilizing a first symbol-repetition rate. A determination is made to whether data transmission has continued for a preceding period of time and data is transmitted within the communication system utilizing a second symbol-repetition rate based on the determination.

The present invention additionally encompasses an apparatus for data transmission within a spread-spectrum communication system. The apparatus comprises a symbol repeater outputting symbols having a repetition rate based on a determination that a data transmission has continued for a preceding period of time.

Figure 1:
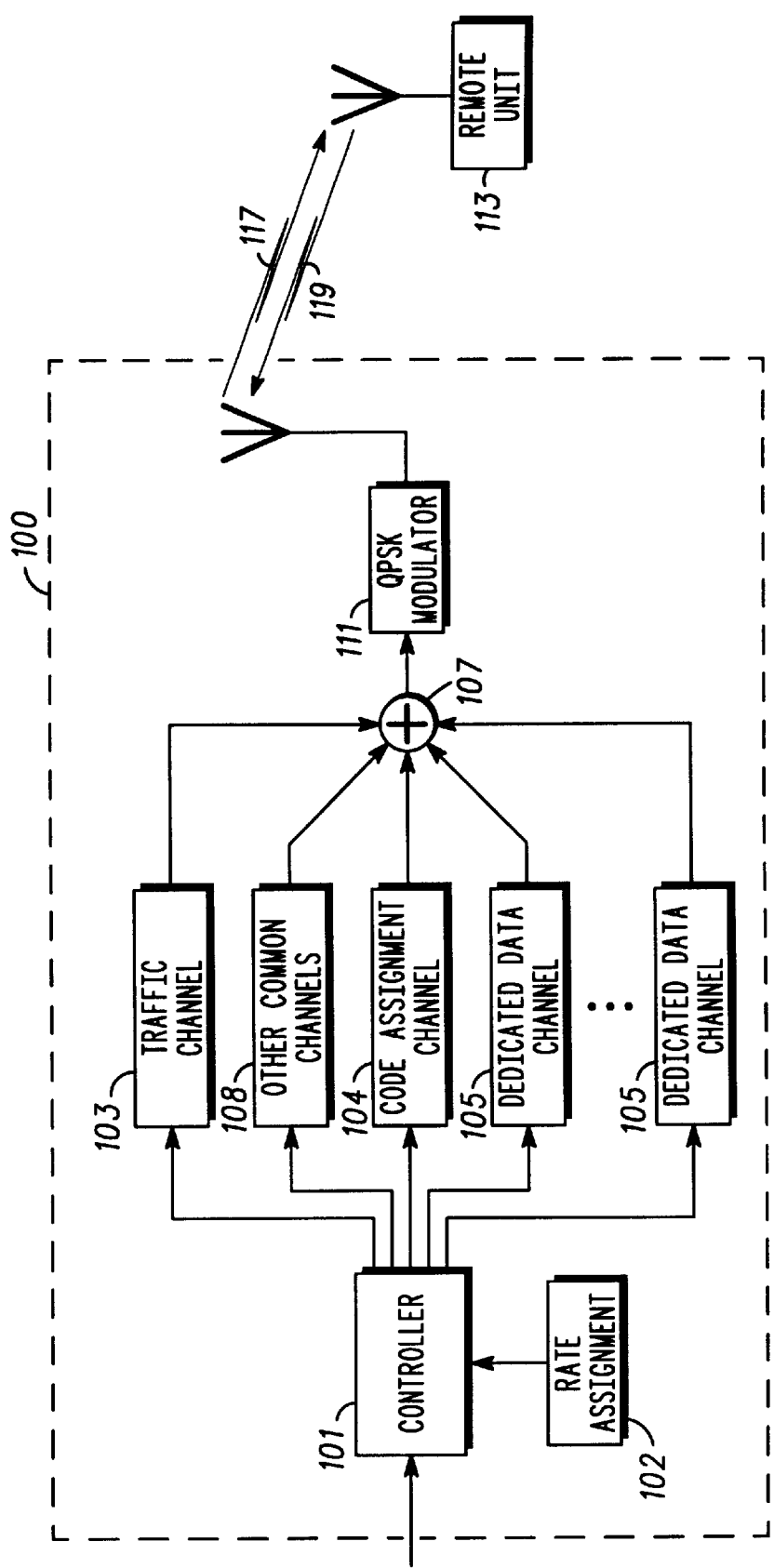
FIG. 1 is a block diagram of a base station for transmitting data in accordance with the preferred embodiment of the present invention.

Turning now to the drawings, where like numerals designate like components, FIG. 1 is a block diagram of base station 100 for transmitting data to remote unit 113 in accordance with the preferred embodiment of the present invention. In the preferred embodiment of the present invention, base station 100 utilizes a next generation CDMA architecture as described in the UMTS Wideband cdma SMG2 UMTS Physical Layer Expert Group Tdoc SMG2 UMTS-L1 221/98 (UMTS 221/98). However, base station 100 may utilize other system protocols such as the cdma2000 International Telecommunication Union-Radio Communication (ITU-R) Radio Transmission Technology (RTT) Candidate Submission document, the next generation Global System for Mobile Communications (GSM) protocol, the CDMA system protocol as described in Cellular System Remote unit-Base Station Compatibility Standard of the Electronic Industry Association/Telecommunications Industry Association Interim Standard 95C (IS-95C), or the CDMA system protocol as described in Cellular System Remote unit-Base Station Compatibility Standard of the Electronic Industry Association/ Telecommunications Industry Association Interim Standard 95A/B (IS-95A/B). Base station 100 comprises base station controller 101, multiple traffic channels 103, one or more dedicated data channels 105, code assignment channel 104, rate assignment circuitry 102, summer 107, and modulator 111. In the preferred embodiment of the present invention, all network elements are available from Motorola, Inc. (Motorola Inc. is located at 1301 East Algonquin Road, Schaumburg, Ill. 60196).

As shown, base station 100 is communicating to remote unit 113 via downlink communication signal 117, and remote unit 113 is communicating to base station 100 via uplink communication signal 119. It is contemplated that network elements within communication system 100 are configured in well known manners with processors, memories, instruction sets, and the like, which function in any suitable manner to perform the function set forth herein.

In the preferred embodiment, the code assignment channel is used for assigning channelization codes to all remote units in communication with base station 100. In the preferred embodiment of the present invention channelization codes arc OVSF codes selected from the hierarchy of such codes described in detail in "Tree Structured Generation of Orthogonal Spreading Codes with different lengths for Forward Link of DS-CDMA Mobile Radio," Electronics Letters, Jan. 2, 1997, pp.27–28, by F. Adachi, M. Sawahashi, and K. Okawa.

Traffic channels 103 are similar to existing CDMA traffic channels, and are used for voice and signaling. As described in UMTS 221/98, the transmission rate of this channel may vary dynamically. Additionally, soft handoff (simultaneous communication utilizing more than one traffic channel 103) is supported utilizing traffic channel circuitry 103.

Other common channel 108 includes channels such as a paging channel (PCH). broadcast channel (BCH), forward access channel (FACH), synchronization channel (SCH), as well as other known channels.

As discussed above, dedicated data channels 105 are utilized for communicating high data rate services to remote unit 113. In the preferred embodiment of the present invention the data rate of the dedicated data channels is initiated at a low rate and allowed to climb as other users power control algorithms react to the sudden usage of the supplemental channel. In a first embodiment of the present invention this is accomplished by initially assigning a data transmission a first OVSF code (or Walsh code) having a first length (corresponding to a first data rate), and switching to other OVSF codes of decreasing length (i.e., increasing the data rate) over time as long as there is data to transmit. This allows other users sufficient time to react to a sudden usage of a supplemental channel. During brief idle periods, the length of the OVSF code is not immediately increased to the first length since power control algorithms for other users will continue to transmit at higher power for some period of time after data transmission ceases.

In a second embodiment of the present invention data transmission is initiated utilizing a first symbol-repetition rate (corresponding to a first data rate), and decreasing the repetition rate (i.e., increasing the data rate) over time as long as there is data to transmit. This allows other users sufficient time to react to a sudden usage of a supplemental channel. During brief idle periods, the repetition rate is not immediately increased to the first rate since power control algorithms for other users will continue to transmit at higher power for some period of time after data transmission ceases.

Data transmission from base station 100 in accordance with the preferred embodiment of the present invention occurs as follows: During time periods where remote unit 113 is not actively communicating to base station 100 utilizing either a traffic channel, or a dedicated data channel, remote unit 113 is actively or periodically monitoring a forward control channel (UMTS downlink shared control channel) for notification of any pending transmission by base station 100. In particular, downlink shared control channel circuitry (not shown) is utilized to send messages to remote unit 113 indicating pending downlink transmissions. In the preferred embodiment of the present invention, downlink shared control channels circuitry is similar to that described in UMTS 221/98. Base station 100 determines that a high data rate transmission to remote unit 113 needs to take place and determines if dedicated data channel circuitry 105 is available for utilization. Due to the limited number of dedicated data channels available for communication, a dedicated data channel may not be immediately available for transmission to remote unit 113. Once dedicated data channel circuitry 105 becomes available. remote unit 113 is notified of a pending data transmission (via a downlink shared control channel) and remote unit 113 is assigned a first spreading code (OVSF Code) utilized by dedicated data channel 105 and a first symbol-repetition rate. Data transmission then begins utilizing dedicated data channel 105, the first spreading code, and the first repetition rate.

As discussed above, during data transmission abrupt transmissions at high data rate can overwhelm other user's power control algorithms. In order to address these problems, in the first embodiment of the invention, rate assignment circuitry 102 detects when a data transmission begins and originally assigns an OVSF code corresponding to low data rate. Over time, base station controller 101 determines when an OVSF code should be changed (i.e., data rate increased or decreased). The OVSF codes are changed in order to gradually increase the data rate, up to a maximum allowable data rate. Once data transmission ceases the OVSF codes are changed in order to gradually decrease the data rate, down to a lowest allowable data rate.

In the second embodiment of the invention, rate assignment circuitry 102 detects when a data transmission begins and originally assigns a symbol-repetition rate corresponding to low data rate. Over time, base station controller 101 determines when the symbol-repetition rate should be changed (i.e., data rate increased or decreased). The repetition rate is changed in order to gradually increase the data rate, up to a maximum allowable data rate. Once data transmission ceases the repetition rates are changed in order to gradually decrease the data rate, down to a lowest allowable data rate.

Figure 2:
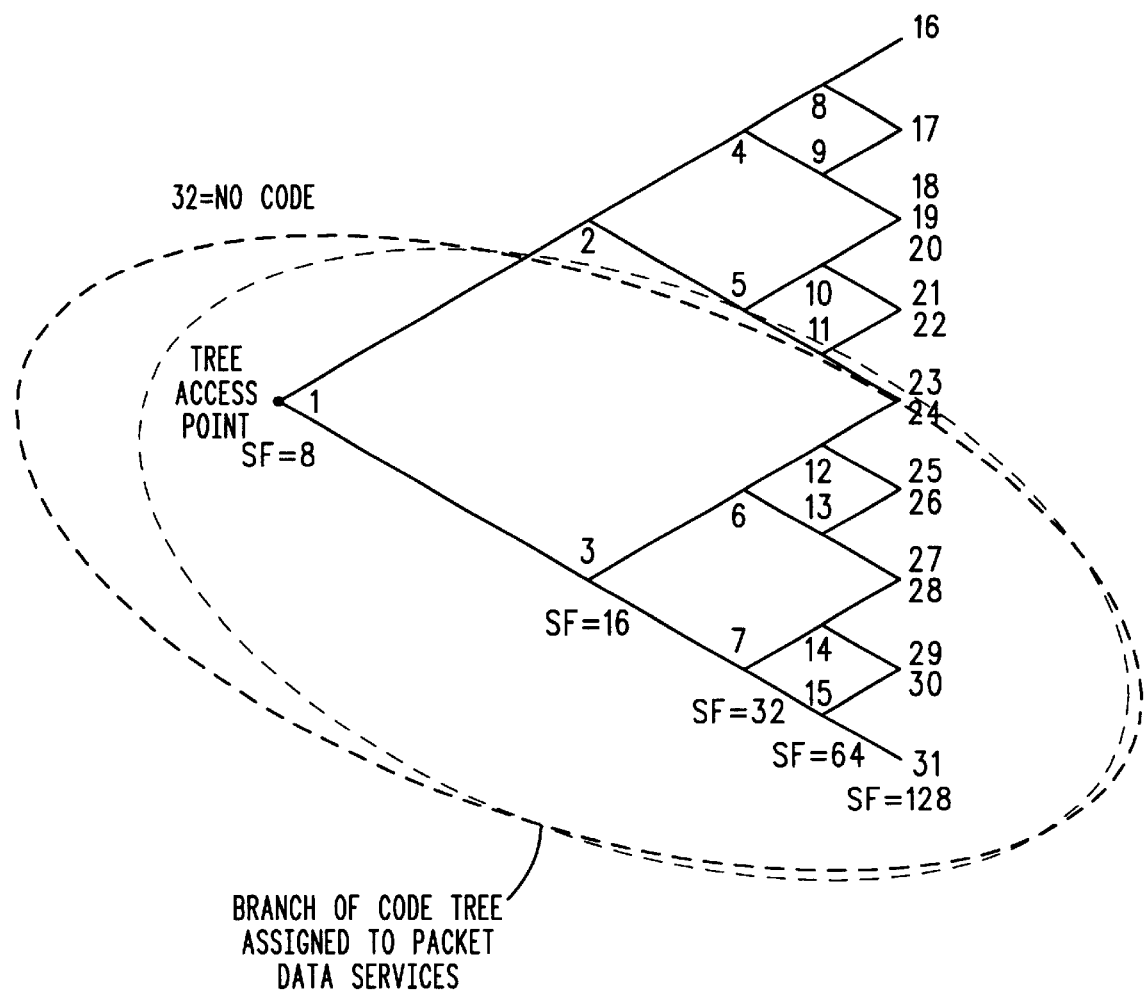
FIG. 2 is an illustration of the assignment of orthogonal variable spreading factor codes in accordance with the preferred embodiment of the present invention.

In the first embodiment of the present invention, remote unit 113 is notified of an OVSF code change by utilizing a downlink code assignment channel that utilizes a single fixed unique OVSF code known to the remote units in communication with base station 100. Each remote unit 113 in communication with base station 100 is allocated a downlink and uplink dedicated data channel without a permanent OVSF code assignment. Thus the OVSF codes assigned to each remote unit 113 can change on a frame by frame basis. OVSF codes are assigned as described in UMTS 221/98, section 4.3.2. As described in section 4.3.2, and illustrated in FIG. 2, a segment of the code tree is assigned for packet data services (e.g., nodes 3, 6, 7, 12, 13, 14, 15, and 24–31). For higher data rates, requiring lower spreading factors, fewer codes are available. Thus, as shown in FIG. 2, at the highest data rate (utilizing code 1, and a spreading factor of 8) only a single channel (code) is available for utilization. As the spreading factors increase, and the data rates decrease, and as such more channels become available such that at a spreading factor of 128, 16 channels become available for utilization.

In the second embodiment of the present invention remote unit 113 senses a symbol-repetition rate change as described in TR45.5.3.1/99.01.12.16 "Symbol Repetition for Forward and Reverse Supplemental Code Channel" by Yu-Cheun Jou et al., and incorporated by reference herein.

Figure 3:
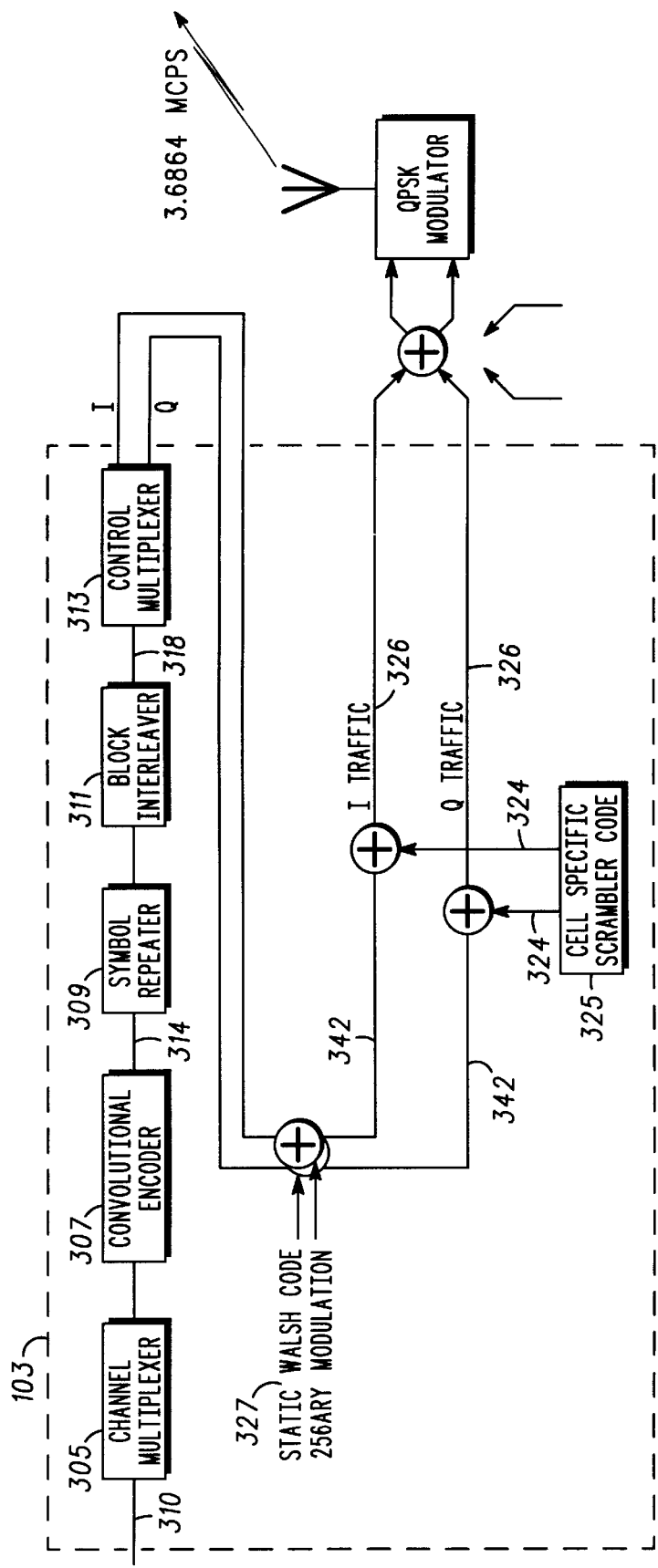
FIG. 3 is a block diagram of the code assignment channel of FIG. 1 for assigning a proper orthogonal code to a remote unit in accordance with the preferred embodiment of the present invention.

FIG. 3 is a block diagram of code assignment channel of FIG. 1 for assigning a proper orthogonal code to a remote unit in accordance with the first embodiment of the present invention. Code assignment channel 103 includes channel multiplexer 305, convolutional encoder 307, symbol repeater 309, block interleaver 311, control multiplexer 313, orthogonal encoder 327, and scrambler 325. During operation, data 310 is received by channel multiplexer 305 at a particular bit rate. Data bits 310 include remote unit ID information and a particular OVSF code assignment for the remote unit. An example of data bits 310 is illustrated in table 1.

TABLE 1

Downlink remote unit OVSF assignment transmitted by code assignment channel.

| Field | Bits | Reference |
|---|---|---|
| ID | 6 | A 6-bit temporary ID providing equivalent resolution as GPRS (Slot + USF <=> 3 + 3) used to identify an allocation. |
| OVSF Code Assignment | 7 | Assigns a specific branch of the code tree. |

Channel multiplexer 305 multiplexes data, and/or control and signaling traffic onto the data 310 and outputs the multiplexed data to convolutional encoder 307. Convolutional encoder 307 encodes input data bits 310 into data symbols at a fixed encoding rate with an encoding algorithm which facilitates subsequent maximum likelihood decoding of the data symbols into data bits (e.g. convolutional or block coding algorithms). For example, convolutional encoder 307 encodes input data bits 310 at a fixed encoding rate of one data bit to three data bits (i.e., rate 1/3) such that convolutional encoder 307 outputs data symbols 314 at a 32 ksymbol/second rate. At 32 ksymbol/second, using rate 1/3 encoding, 6 remote unit OVSF assignments can be made per 10 millisecond frame.

Data symbols 314 are then repeated by repeater 309 and input into interleaver 311. Interleaver 311 interleaves the input data symbols 314 at the symbol level. In interleaver 311, data symbols 314 are individually input into a matrix which defines a predetermined size block of data symbols 314. Data symbols 314 are input into locations within a matrix so that the matrix is filled in a column by column manner. Data symbols 314 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 318 are output by interleaver 311 at the same data symbol rate that they were input (e.g., 32 ksymbol/ second). The predetermined size of the block of data symbols defined by the matrix is derived from the maximum number of data symbols which can be transmitted at a predetermined symbol rate within a predetermined length transmission block.

Interleaved data symbols 318 have control information added and are passed to orthogonal encoder 327. Orthogonal encoder 327 modulo 2 adds a fixed, non-varying orthogonal code having a first length (e.g., a 256-ary Walsh code) to each interleaved and scrambled data symbol 318. For example, in 256-ary orthogonal encoding, interleaved and scrambled data symbols 318 are each exclusive OR'd by a 256 symbol orthogonal code. These 256 orthogonal codes preferably correspond to Walsh codes from a 256 by 256 Hadamard matrix wherein a Walsh code is a single row or column of the matrix. Orthogonal encoder 327 repetitively Outputs a Walsh code which corresponds to input data symbol 318 at a fixed symbol rate.

Sequence of Walsh codes 342 are output to a mixer (not shown) where they are gain controlled. In the preferred embodiment of the present invention Walsh codes 342 are amplified by a fixed, non-varying amount. The power adjusted sequence of Walsh codes are then further spread by a pair of cell-specific scrambling codes 324 to generate an I-channel and Q-channel code spread sequence 326. The I-channel and Q-channel code spread sequences 326 are used to bi-phase modulate a quadrature pair of sinusoids by driving the power level controls of the pair of sinusoids. The sinusoids output signals are summed, QPSK modulated (by modulator 115) and radiated by antenna to complete transmission of channel data bits 310. In the preferred embodiment of the present invention, spread sequences 326 are output at a rate of 4.096 Mega Chips per second (Mcps) and radiated within a 5 MHz bandwidth, but in alternate embodiments of the present invention, spread sequences 326 may be output at a different rate and radiated within a different bandwidth.

Figure 4:
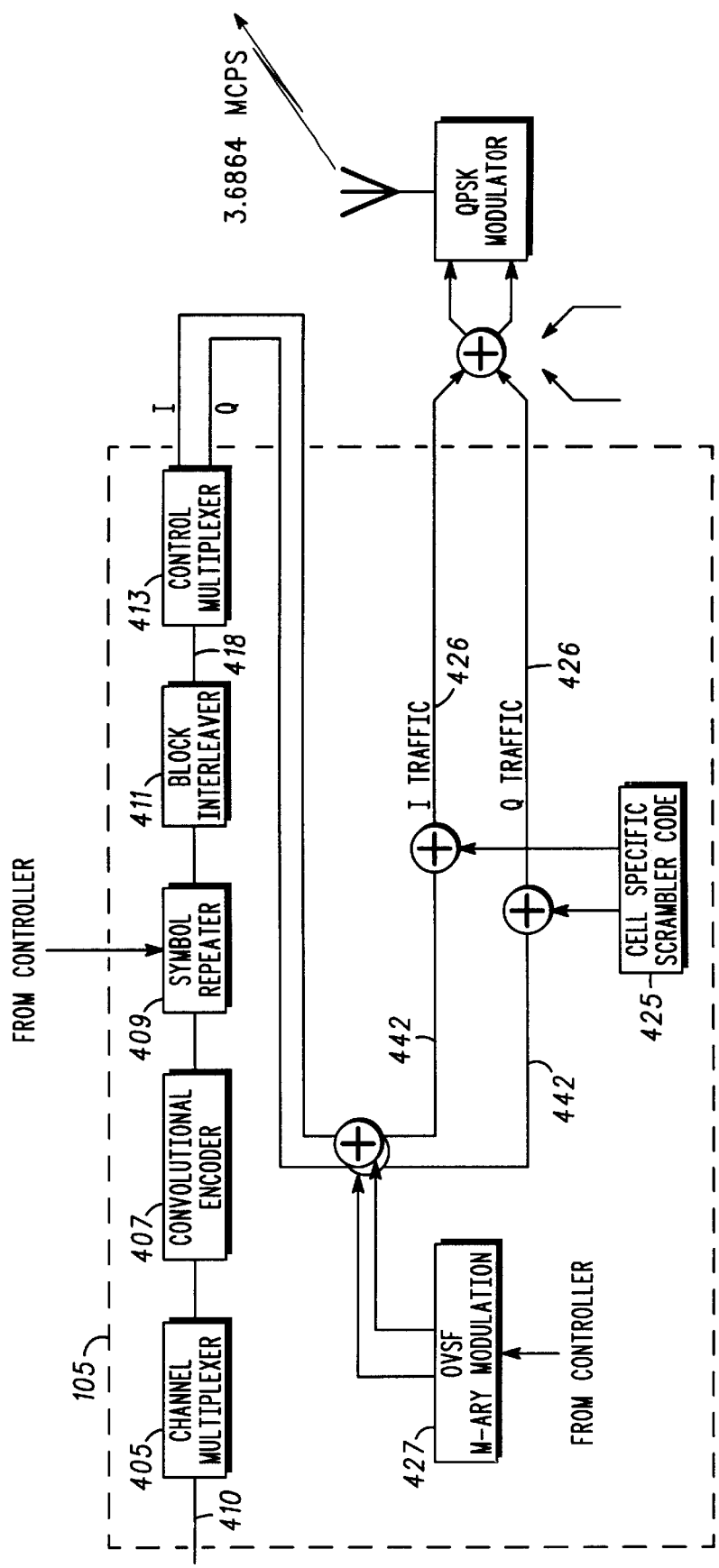
FIG. 4 is a block diagram of the dedicated data channel of FIG. 1 for transmitting data in accordance with the preferred embodiment of the present invention.

FIG. 4 is a block diagram of dedicated data channel circuitry 105 of FIG. 1 for transmitting data in accordance with the preferred embodiment of the present invention. Dedicated data channel circuitry 105 includes channel multiplexer 405, convolutional encoder 407, symbol repeater 409, block interleaver 411, control multiplexer 413, orthogonal encoder 427, and scrambler 425. Operation of dedicated data channel circuitry 105 occurs in a similar manner as traffic channel circuitry 103 except that in the first embodiment, orthogonal encoder 427 modulo 2 adds an orthogonal code having a variable length (e.g., a length-M Walsh code) to each interleaved and scrambled data symbol 418. These M-length orthogonal codes preferably correspond to Walsh codes from a M by M Hadamard matrix wherein a Walsh code is a single row or column of the matrix. Orthogonal encoder 427 is instructed by controller 101 as to what particular orthogonal code to utilize. For example, in the first embodiment of the present invention remote units that have been transmitting data for a long period are assigned a first length Walsh code (e.g., length 16) while remote units just beginning data transmission are assigned a second length Walsh code (e.g., length 128).

Additionally, in the second embodiment of the present invention symbol repeater 409 is instructed by controller 101 to vary the symbol-repetition rate accordingly. For example, in the second embodiment of the present invention remote units that have been transmitting data for a long period are assigned a first repetition rate (e.g., no repetition)

while remote units just beginning data transmission are assigned a second repetition rate (e.g., 16 times).

Varying a user's spreading code and repetition rate as described above allows for data transmission rates to vary accordingly, decreasing system interference. More particularly, because data transmission is begun using larger-length Walsh codes and larger repetition rates, and progressively utilizes shorter Walsh codes and shorter repetition rates, the transmission of data at high rates does not overwhelm other users.

Figure 5:
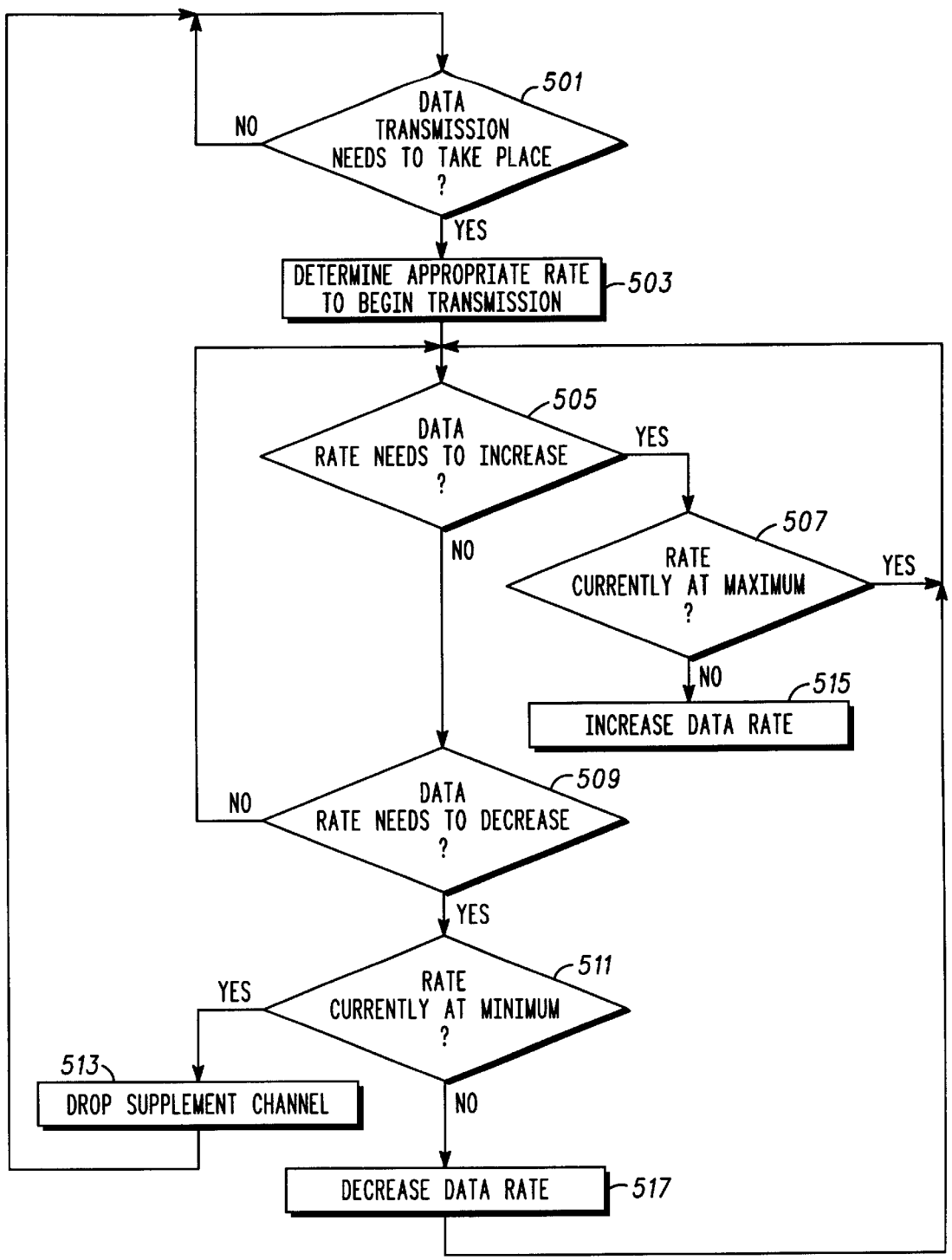
FIG. 5 is a flow chart illustrating rate assignment in accordance with the preferred embodiment of the present invention.

FIG. 5 is a flow chart illustrating code assignment in accordance with the preferred embodiment of the present invention. The logic flow begins at step 501 where controller 101 determines if data transmission to remote unit 113 needs to take place utilizing a supplemental channel. If, at step 501 it is determined that data transmission needs to take place, then the logic flow continues to step 503, otherwise the logic flow returns to step 501. At step 503 controller 101 accesses rate assignment circuitry 102 and determines an appropriate rate to begin data transmission. In particular, data transmission takes place utilizing a first (low rate) OVSF code and a first repetition rate.

Continuing, at step 505 controller 101 determines if the data rate needs to increase, and if so the logic flow continues to step 507, otherwise the logic flow continues to step 509. In the preferred embodiment of the present invention a determination that the data rate needs to increase is made by controller 101 when there has been download activity for the for a preceding period of time. In the preferred embodiment of the present invention the data rate is increased if there has been download activity within the last 50 milliseconds.

Continuing, at step 507 controller 101 determines if the data rate is currently at a maximum data rate, and if so the logic flow returns to step 505. If, at step 507 it is determined that the data rate is not currently at a maximum data rate, then the data rate is increased (step 515). In the first embodiment of the present invention the data rate is increased by decreasing the length of the OVSF code utilized by the supplemental channel, and in the second embodiment of the present invention the data rate is increased by decreasing the symbol-repetition rate. In the preferred embodiment of the present invention the length of the OVSF code is increased by switching to different OVSF codes having differing lengths, however, one of ordinary skill in the art will recognize that the length of an OVSF code may be varied in several ways.

At step 509 controller 101 determines if the data rate needs to decrease, and if not, the logic flow returns to step 505, otherwise the logic flow continues to step 511 . In the preferred embodiment of the present invention a determination that the data rate needs to decrease is made by controller 101. In particular, controller 101 determines download activity, and if there has been no download activity for the for a preceding period of time, a determination is made that the data rate needs to decrease. In the preferred embodiment of the present invention the data rate is decreased if there has been no download activity within the last 50 milliseconds.

At step 511 it is determined if the data rate is currently at a minimum data rate, and if so the logic flow continues to step 513 where the supplemental channel is dropped and data transmission ceases. If, at step 511 it is determined that the data rate is not currently at a minimum data rate, then the data rate is decreased (step 517). In the first embodiment of the present invention the data rate is decreased by increasing the length of the Walsh code utilized by the supplemental channel, and in the second embodiment of the present invention the data rate is decreased by increasing the symbol-repetition rate. The logic flow then returns to step 507.

The descriptions of the invention, the specific details, and the drawings mentioned above, are not meant to limit the scope of the present invention. For example, although the first embodiment of the present invention was described above as it relates to changing downlink OVSF codes, one of ordinary skill in the art will recognize that uplink OVSF codes may be changed in a similar manner without varying from the scope of the present invention. In this case both downlink and uplink OVSF codes may be assigned by utilizing the same code assignment channel 104. Additionally, a combination of the first and the second embodiment may be made without varying from the scope of the present invention. For example, both the OVSF code and the symbol-repetition rate can be changes simultaneously to effect data transmission rate. It is the intent of the inventors that such modifications can be made to the present invention without varying from the spirit and scope of the invention, and it is intended that all such modifications come within the scope of the following claims and their equivalents.

What is claimed is:

1. A method for data transmission within a spread-spectrum communication system, the method comprising the steps of:
    determining that a data transmission needs to take place;
    initiating data transmission within the communication system utilizing a first Orthogonal Variable Spreading Factor (OVSF) code;
    determining if data transmission has continued for a preceding period of time to produce a determination;
    transmitting data within the communication system utilizing a second OVSF code based on the determination;
    wherein the step of transmitting data within the communication system utilizing the second OVSF code based on the determination comprises the steps of transmitting data within the communication system utilizing a second OVSF code of lesser length than the first OVSF code when data transmission has continued for the preceding period of time, and transmitting data within the communication system utilizing a second OVSF code of greater length than the first OVSF code when data transmission has not continued for the preceding period of time.

2. The method of claim 1 further comprising the steps of:
    initiating data transmission within the communication system utilizing a first symbol-repetition rate; and
    transmitting data within the communication system utilizing a second symbol-repetition rate based on the determination.

3. The method of claim 2 wherein the first symbol-repetition rate corresponds to a low-data-rate symbol repetition rate and the second symbol-repetition rate corresponds to a high-data-rate symbol repetition rate.

4. The method of claim 1 wherein the step of initiating data transmission within the communication system utilizing the first OVSF code comprises the step of initiating data transmission within the communication system utilizing a low-data-rate OVSF code.

5. The method of claim 1 wherein the Step of transmitting data within the communication system utilizing the second OVSF code based on the determination comprises the step of transmitting data within the communication system utilizing the second OVSF code based on the determination, wherein the second OVSF code corresponds to a higher data rate OVSF code.

6. A method for data transmission within a spread-spectrum communication system, the method comprising the steps of:

determining that data transmission needs to take place;

initiating data transmission within the communication system utilizing a first symbol-repetition rate;

determining if data transmission has continued for a preceding period of time to produce a determination;

transmitting data within the communication system utilizing a second symbol-repetition rate based on the determination;

wherein the step of transmitting data within the communication system utilizing the second symbol-repetition rate based on the determination comprises the steps of transmitting data within the communication system utilizing a second symbol-repetition rate of lesser length than the first symbol-repetition rate when data transmission has continued for the preceding period of time, and transmitting data within the communication system utilizing a second symbol-repetition rate of greater length than the first symbol-repetition rate when data transmission has not continued for the preceding period of time.

7. The method of claim 6 further comprising the steps of:

initiating data transmission within the communication system utilizing a first Orthogonal Variable Spreading Factor (OVSF) code; and transmitting data within the communication system utilizing a second OVSF code based on the determination.

8. The method of claim 7 wherein the first OVSF code corresponds to a low-data-rate code and the second OVSF code corresponds to a high-data-rate code.

9. The method of claim 6 wherein the step of initiating data transmission within the communication system utilizing the first symbol-repetition rate comprises the step of initiating data transmission within the communication system utilizing a symbol-repetition rate corresponding to a low data rate.

10. The method of claim 6 wherein the step of transmitting data within the communication system utilizing the second symbol-repetition rate based on the determination comprises the step of transmitting data within the communication system utilizing the second symbol-repetition rate based on the determination, wherein the second symbol-repetition rate corresponds with a higher data rate.

11. An apparatus for data transmission within a spread-spectrum communication system, the apparatus comprising a symbol repeater outputting symbols having a repetition rate based on a determination that a data transmission has continued for a preceding period of time, wherein the symbol repeater utilizes a symbol-repetition rate of a lesser rate when data transmission has continued for the preceding period of time, otherwise the symbol repeater utilizes a symbol-repetition rate of a greater rate when data transmission has not continued for the preceding period of time.

12. The apparatus of claim 11 further comprising a orthogonal encoder outputting an Orthoganol Variable Spreading Factor (OVSF) code having a length based on the determination.

* * * * *